March 29, 1949.　　　H. D. DUFAULT　　　2,465,361
UNITARY HEATING APPARATUS FOR INSERTION
IN RANGE COMPARTMENTS
Filed Oct. 23, 1945　　　　　　2 Sheets-Sheet 1
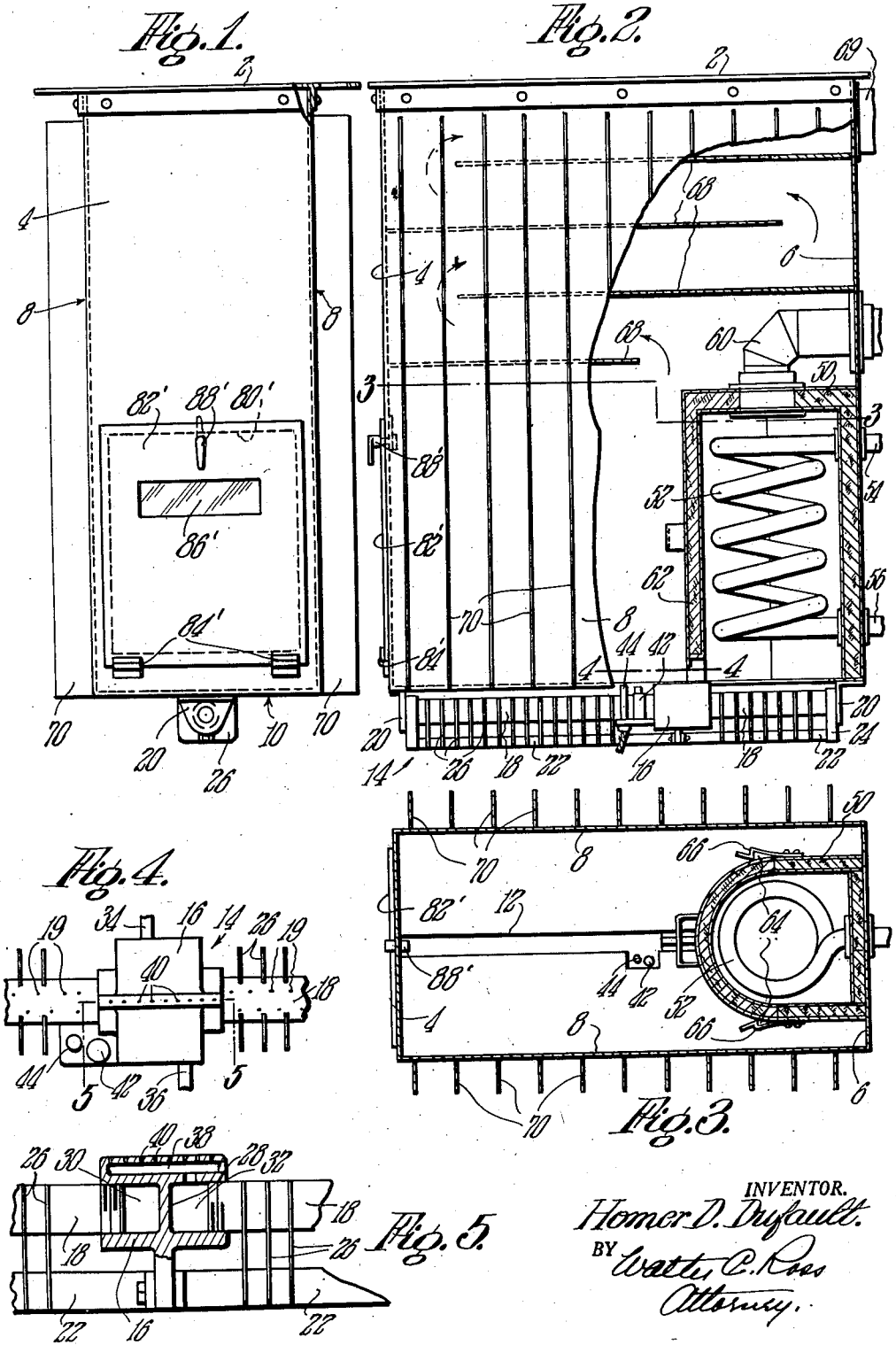
INVENTOR.
Homer D. Dufault.
BY Watts C. Ross
Attorney.

March 29, 1949. H. D. DUFAULT 2,465,361
UNITARY HEATING APPARATUS FOR INSERTION
IN RANGE COMPARTMENTS
Filed Oct. 23, 1945 2 Sheets-Sheet 2

INVENTOR.
Homer D. Dufault.
BY Walter C. Ross
Attorney.

Patented Mar. 29, 1949

2,465,361

UNITED STATES PATENT OFFICE 2,465,361

UNITARY HEATING APPARATUS FOR INSERTION IN RANGE COMPARTMENTS

Homer D. Dufault, Easthampton, Mass., assignor to Heatbath Corporation, Springfield, Mass., a corporation of Massachusetts Application October 23, 1945, Serial No. 624,055

1 Claim. (Cl. 126—4)

This invention relates to heating apparatus and is directed to improvements in room and water heating apparatus adapted for use in connection with ranges such as gas kitchen ranges.

The principal objects of the invention are directed to a self-contained unitary heating apparatus which is adapted for insertion in the so-called utility compartment of a gas range which is so constructed and arranged that it is possible to provide general heat for a room and to heat water and thereby not only utilize the space in a range but provide an efficient apparatus.

Present day gas ranges have burners in the top side and an oven and broiler in the lower part of the range with one or more utility compartments which are used for enclosing utensils and the like.

According to this invention, there is provided a heating apparatus which is insertable in the utility compartment of a range and it is so constructed and arranged that the utility compartment may be utilized for heating the room and at the same time water for a hot water circulating system may be heated, all of which is accomplished by the provision of a self contained unitary structure having separate and independently operable heating and water heating compartments.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Figs. 1 and 2 are front and side elevational views respectively of heating apparatus embodying the novel features of the invention;

Fig. 3 is a sectional plan view on the line 3—3 of Fig. 2;

Fig. 4 is a plan view on the line 4—4 of Fig. 2;

Fig. 5 is an elevational sectional view on the line 5—5 of Fig. 4;

Figure 6:
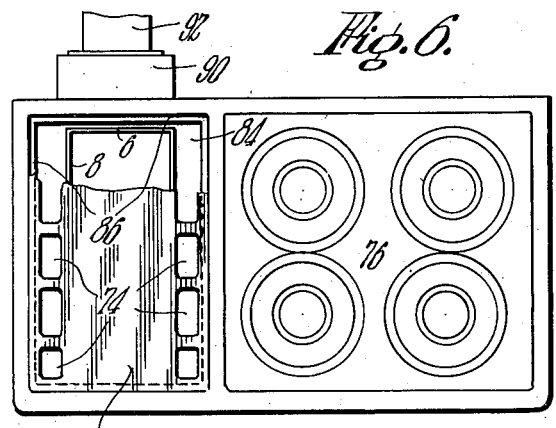
Fig. 6 is a plan view of a range having the novel features of the invention associated therewith.

Referring now to the drawings more in detail, the invention will be fully described.

A top plate 2 has secured thereto and depending therefrom front, rear and side walls 4, 6 and 8 with a bottom wall 10 connected thereto to provide a closed compartment. The said bottom wall is provided with a longitudinal slot 12 and a gas burner indicated generally by 14 is disposed therebelow.

The burner 14 includes a central body 16 from opposite sides of which extend long and short tubular members 18 that are fixed in brackets 20 depending from the bottom wall 10. Bars 22 have their inner ends secured to the body 16 and their outer ends are secured to straps 24 depending from the tubes 18. Cooling fins 26 are associated with the tubes 18 and bars 22.

The body has a partition 28 therein to provide separate chambers 30 and 32 from which the tubes 18 extend. Gas is supplied the chambers through pipes 34 and 36.

An upper channel 38 is provided in the body and ports 40 which may be called runner ports extend therefrom through the top of the body.

A pilot burner 42 is provided which is supplied with gas and a thermocouple 44 is disposed adjacent thereto. The pilot valve will be supplied with gas and the pipes 34 and 36 will have shut-off valves associated therewith so that the flow of gas to the long and short tubes may be controlled. The thermocouple will be connected to a valve in the supply of gas to the pilot valve so as to shut off the gas should the pilot flame be extinguished.

When the valve in the pipe 34 is open, gas flows to the chamber 30, through the longer tube 18 and out of the ports 19. When the valve in pipe 36 is open gas is supplied the chamber 32 so that it flows into the short tube 18 and out the ports 19 thereof. With the pilot burner in operation when gas is supplied to either of the chambers, gas from the tubes 18 is ignited. The gas from runner ports is ignited so as to ignite the gas from the ports of the shorter tube 18.

By providing separate gas supplies to the long and the short tubes and with valves in the pipes 34 and 36, the long tube or the short tube may be independently operated or both may be operated simultaneously.

The long tube is for supplying heat to the heating chamber formed by the walls described. The short tube is for heating the water heater which will be described.

The water heater includes an insulated casing 50 which is associated with the rear wall 6. A coil 52 is disposed therein which has an outlet 54 and an inlet 56. This coil may be connected to a hot water supply system which usually includes a storage tank.

A flue pipe 60 extends from the upper side of the casing 50 and through the rear wall 6 of the compartment. An insulated front cover 62 is provided for the casing 50 which is more or less semi-circular in cross section. Said cover is held in place on the casing so as to cooperate therewith to enclose the coil 52 and provide an insulated compartment for said coil within the heating compartment so that when the shorter tube 18 only is in operation the compartment will not be heated. Lugs 64 on the cover 62 are arranged to be releasably engaged by spring-like members 66 which are secured to the casing 50. In this way the cover 62 is releasably held on the casing 50.

Baffles 68 are provided which extend outwardly from the front and rear walls 4 and 6 and have their opposite ends spaced from opposite walls so as to provide a circuitous passageway upwardly through the chamber to a flue 69 adjacent the upper side thereof.

When the longer tube 18 is in operation the products of combustion and heat pass upwardly through the chamber and through the circuitous passageway so that the walls of the compartment will be heated. To facilitate heating of air, spaced fins 70 are provided on the side walls of the compartment. The upper plate member 2 is provided with a plurality of openings 74 as shown in Figs. 1 and 6.

Figure 7:
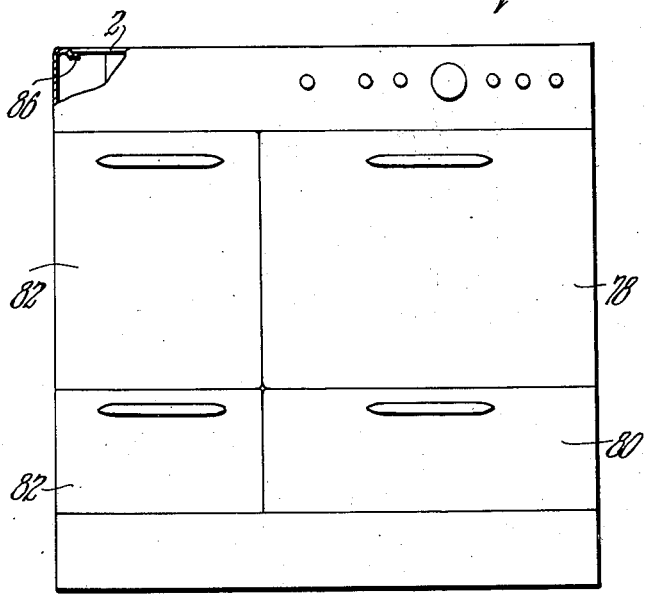
Fig. 7 is a front elevational view of the range shown in Fig. 6.
Figure 8:
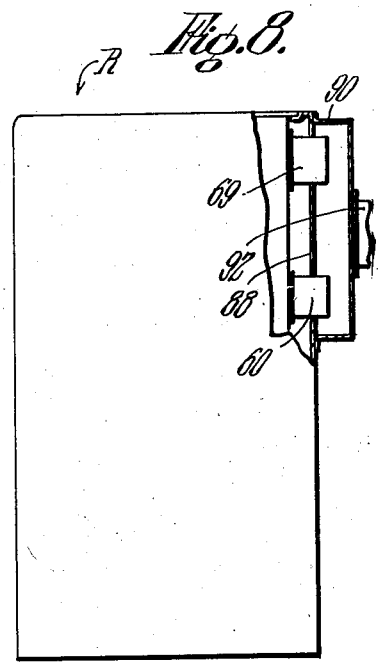
Fig. 8 is a side elevational view of the range shown in Figs. 6 and 7.

A gas range is represented by R in Figs. 6, 7 and 8 which has burners 76 on the upper side thereof. A door 78 is disposed in front of an oven and a door 80 therebelow is disposed over a broiler. One or more doors such as 82 are disposed over a utility compartment and the upper side of the stove has an opening 84 provided with inwardly extending peripheral flange or lip 86.

The heating apparatus described is constructed and arranged for inserting downwardly through the opening 84 and the marginal edge portions of the plate 2 rest on the flange 86 of the range top. The flues 60 and 69 extend through a rear wall 88 of the range and into a flue box 90 secured thereto and from which extends a flue pipe 92 that is usually connected to a stack or smoke pipe. In operation with the apparatus inserted in the range as described either the long or the short tube 18 may be operated, the short tube for heating the water in coil 52, and the long tube for heating the compartment. With the short tube only in operation the coil 52 is heated without heating the compartment.

Air passes upwardly past the hot walls and fins of the compartment so that it is heated and flows out the outlets 74 in plate 2 which is heated and functions as a hot plate.

An opening 80' is provided in the wall 4 and a door 82' hinged to the wall at 84' has a transparent window 86'. A latching device 88' is carried by the door.

The construction provides a unitary apparatus for general heating purposes and for heating water which is independent of the range although adapted to be mounted therein. The hot water and heating compartments are separate and either may be used independently of the other.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

Unitary air heating apparatus adapted for insertion in a compartment of a range having an open upper side and to be supported by the top of the range comprising in combination, a compartment formed of outer horizontal upper and lower walls and vertical front and side and rear walls, secondary walls extending from the inner face of the rear wall of said compartment and spaced inwardly and downwardly from the side and upper walls of said compartment forming an inner heating compartment, the lower wall of said compartment being provided with a slot extending between the front and rear walls of said compartment for the passage of products of combustion into said compartment, a primary horizontal baffle extending inwardly from the front wall and between the side walls of said compartment terminating at a distance from said inner heating compartment forming therewith a restricted passageway therebetween, a series of secondary horizontal baffles above said primary baffle extending inwardly and alternately from the rear and front walls and between the side walls of said compartment and terminating at distances from the opposite walls and providing vertical passageways therebetween, said other secondary baffles being spaced apart vertically relative to each other and to said primary baffle therebelow, the spaces between all of said baffles providing horizontal passageways connected to the vertical passageways and cooperating with each other to provide a continuous circuitous passageway between upper and lower portions of said compartment, a flue leading from the upper portion of said compartment, and a flange extending outwardly horizontally from the vertical front and side and rear walls of said compartment for resting on the top of a range around the vertical compartment disposed therein for supporting the apparatus.

HOMER D. DUFAULT.

REFERENCES CITED

The following references are of record in the file of this patent:

UNITED STATES PATENTS

| Number | Name | Date |
|---|---|---|
| 681,245 | Muir | Aug. 27, 1901 |
| 1,459,762 | Bowman | June 26, 1923 |
| 1,621,141 | Toomey | Mar. 15, 1927 |
| 1,989,372 | Leonard | Jan. 29, 1935 |
| 2,088,444 | Schneider | July 27, 1937 |
| 2,159,156 | Honer | May 23, 1939 |
| 2,163,552 | Dufault | June 20, 1939 |
| 2,314,249 | Sherman | Mar. 16, 1943 |
| 2,369,972 | Meagher | Feb. 20, 1945 |